United States Patent
Saito et al.

(10) Patent No.: US 8,553,378 B2
(45) Date of Patent: Oct. 8, 2013

(54) SWITCHING CIRCUIT AND DC-TO-DC CONVERTER

(75) Inventors: Hiroshi Saito, Tokyo (JP); Yuichi Goto, Kanagawa-ken (JP); Kei Kasai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 27 days.

(21) Appl. No.: 13/421,078

(22) Filed: Mar. 15, 2012

(65) Prior Publication Data
US 2012/0313600 A1    Dec. 13, 2012

(30) Foreign Application Priority Data
Jun. 13, 2011 (JP) ................................ 2011-131586

(51) Int. Cl.
*H02H 9/08* (2006.01)
(52) U.S. Cl.
USPC ............................................. 361/18; 391/93.9
(58) Field of Classification Search
USPC .......................................... 361/18, 93.7–93.9
See application file for complete search history.

(56) References Cited

U.S. PATENT DOCUMENTS

| 7,696,739 B2 * | 4/2010 | Bacchi et al. | 323/285 |
| 2009/0284992 A1 * | 11/2009 | Kenly et al. | 363/21.06 |
| 2010/0026256 A1 * | 2/2010 | Liu et al. | 323/282 |
| 2012/0242305 A1 * | 9/2012 | Goto | 323/271 |

FOREIGN PATENT DOCUMENTS
JP    06-311734 A    11/1994

OTHER PUBLICATIONS
Background Art Information Sheet provided by Applicants, Dec. 15, 2011 (1 page total).

* cited by examiner

*Primary Examiner* — Danny Nguyen
(74) *Attorney, Agent, or Firm* — Posz Law Group, PLC

(57) ABSTRACT

According to one embodiment, a switching circuit includes a high-side switch, a rectifier, and a driver. The high-side switch is connected between a high potential terminal and an output terminal. The rectifier is connected between the output terminal and a low potential terminal, forward direction of the rectifier is a direction from the low potential terminal to the output terminal. The driver is connected between the high potential terminal and the output terminal. The driver switches a high-side switch ON based on a high-side control signal. The driver switches the high-side switch OFF when a first short detector detects shorts of the output terminal with the low potential terminal after a first period longer than a backward recovery time of the rectifier until the high-side control signal changing.

14 Claims, 10 Drawing Sheets

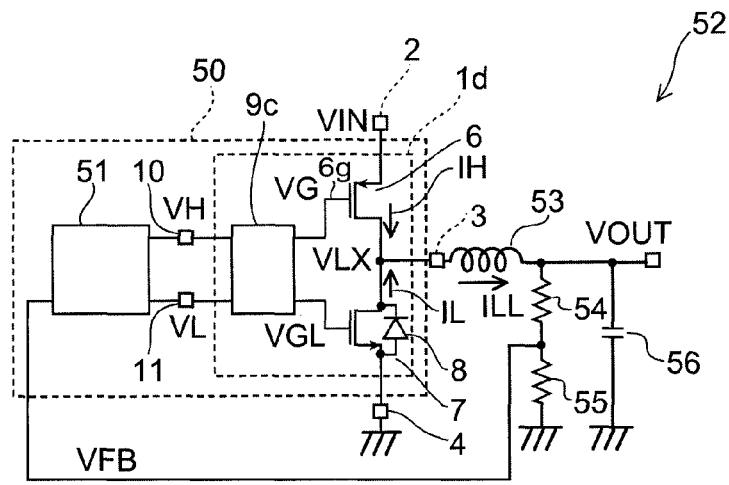
FIG. 12
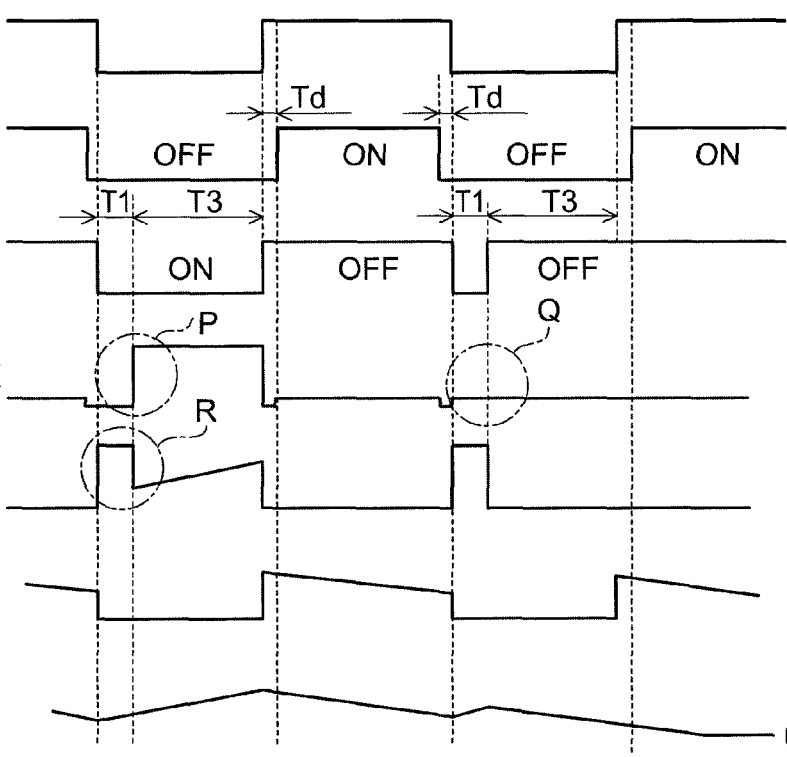
FIG. 13A VH
FIG. 13B VL
FIG. 13C VG
FIG. 13D VLX
FIG. 13E IH
FIG. 13F IL
FIG. 13G ILL FIG. 14A VH
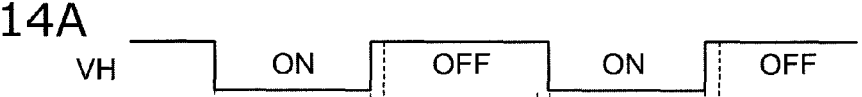
FIG. 14B VL
FIG. 14C VGL
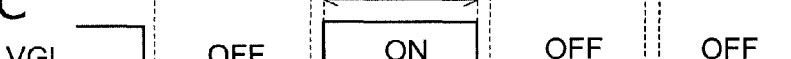
FIG. 14D VLX
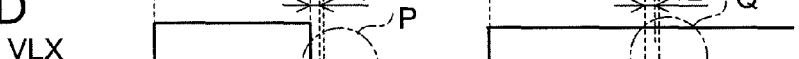
FIG. 14E IH
FIG. 14F IL
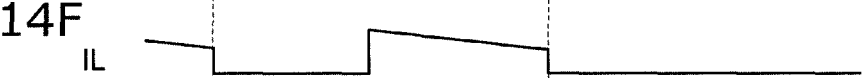
FIG. 14G ILL
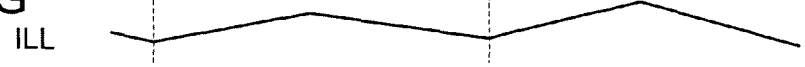

SWITCHING CIRCUIT AND DC-TO-DC CONVERTER

CROSS-REFERENCE TO RELATED APPLICATIONS

This application is based upon and claims the benefit of priority from the prior Japanese Patent Application No. 2011-131586, filed on Jun. 13, 2011; the entire contents of which are incorporated herein by reference.

FIELD

Embodiments described herein relate generally to a switching circuit and a DC-to-DC converter.

BACKGROUND

Switching circuits constituted by a high-side switch and a low-side switch are widely used as output circuits that drive inductive loads. Additionally, for example, in DC-to-DC converters using this type of switching circuit, development of high-current is necessary; and needs to reduce ON-resistance of the switching element by refining the semiconductor process and protect the switching element are growing.

BRIEF DESCRIPTION OF THE DRAWINGS

FIG. 3A illustrates the high-side control signal VH, FIG. 3B illustrates the low-side control signal VL, FIG. 3C illustrates the first pulse signal VP, FIG. 3D illustrates the short detection signal VD, FIG. 3E illustrates the signal VG of the control terminal, 3F illustrates the output potential VLX, FIG. 3G illustrates the shorted-state signal VS, and FIG. 3H illustrates a high-side current IH;

FIG. 8A illustrates the high-side control signal VH, FIG. 8B illustrates the low-side control signal VL, FIG. 8C illustrates the first pulse signal VP, FIG. 8D illustrates the short detection signal VD, FIG. 8E illustrates the signal VG of the control terminal, FIG. 8F illustrates the output potential VLX, FIG. 8G illustrates the shorted-state signal VS, and FIG. 8H illustrates a high-side current IH;

FIG. 11A illustrates the high-side control signal VH, FIG. 11B illustrates the low-side control signal VL, FIG. 11C illustrates the second pulse signal VPL, FIG. 11D illustrates the short detection signal VDL, FIG. 11E illustrates the gate signal VGL, FIG. 11F illustrates the output potential VLX, FIG. 11G illustrates the shorted-state signal VSL, FIG. 11H illustrates a high-side current IH, and FIG. 11I illustrates a low-side current IL;

FIG. 12 is a circuit diagram illustrating a configuration of a DC-to-DC converter according to a fourth embodiment;

FIGS. 13A to 13G are timing charts of major signals of the DC-to-DC converter of the fourth embodiment. FIG. 13A illustrates the high-side control signal VH, FIG. 13B illustrates the low-side control signal VL, FIG. 13C illustrates the signal VG of the control terminal, FIG. 13D illustrates the output potential VLX, FIG. 13E illustrates the high-side current IH, FIG. 13F illustrates a low-side current IL, and FIG. 13G illustrates an inductor current ILL; and FIGS. 14A to 14G are timing charts of the major signals of the DC-to-DC converter of the fourth embodiment, FIG. 14A illustrates the high-side control signal VH, FIG. 14B illustrates the low-side control signal VL, FIG. 14C illustrates the gate signal VGL, FIG. 14D illustrates the output potential VLX, FIG. 14E illustrates the high-side current IH, FIG. 14F illustrates a low-side current IL, and FIG. 14G illustrates the inductor current ILL.

DETAILED DESCRIPTION

Figure 1:
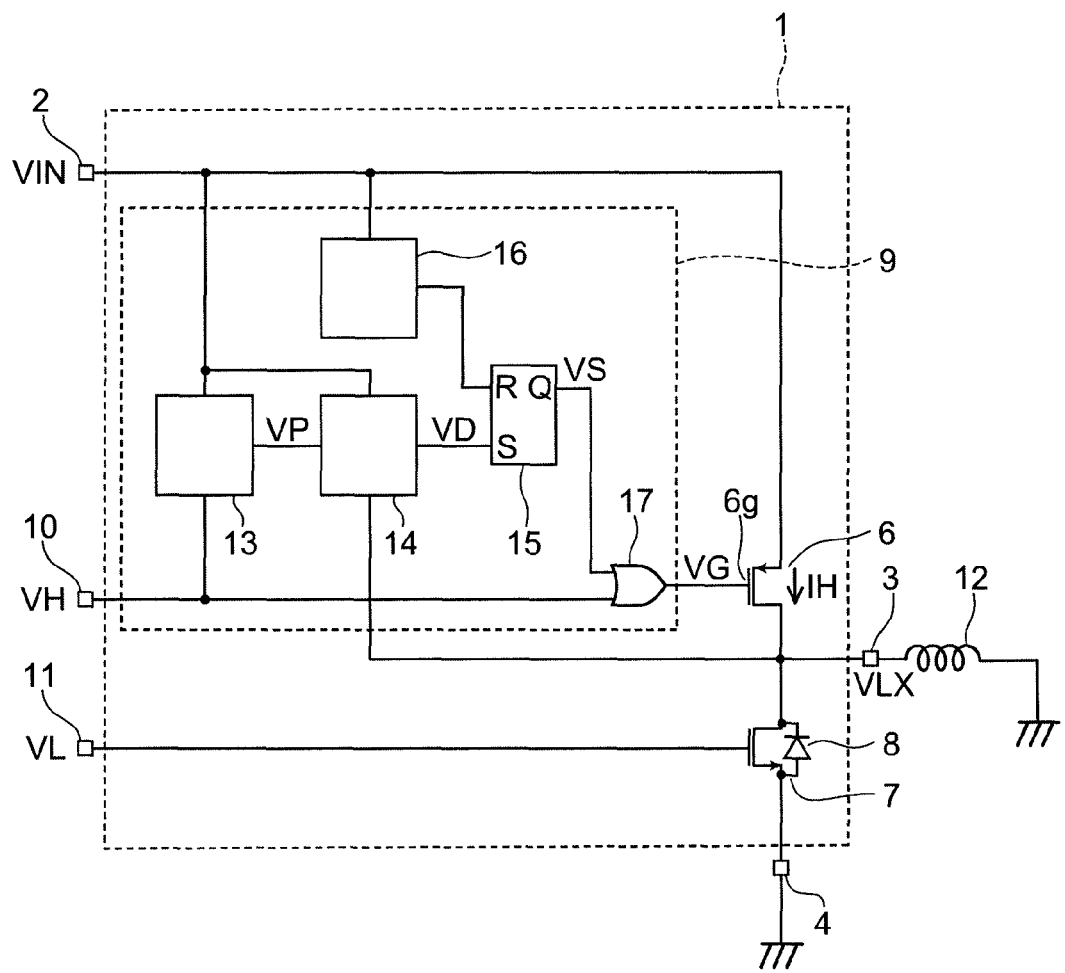
FIG. 1 is a block diagram illustrating a configuration of a switching circuit according to a first embodiment.

In general, according to one embodiment, a switching circuit includes a high-side switch, a rectifier, and a driver. The high-side switch is connected between a high potential terminal and an output terminal. The rectifier is connected between the output terminal and a low potential terminal, forward direction of the rectifier is a direction from the low potential terminal to the output terminal. The driver is connected between the high potential terminal and the output terminal. The driver switches a high-side switch ON based on a high-side control signal. The driver switches the high-side switch OFF when a first short detector detects shorts of the output terminal with the low potential terminal after a first period longer than a backward recovery time of the rectifier until the high-side control signal changing.

Hereinbelow, embodiments are described with reference to the drawings. In the following description, identical components are marked with the same reference numerals, and a description of components once described is omitted as appropriate. The embodiments described below can be appropriately combined.

(First Embodiment)

FIG. 1 is a block diagram illustrating a configuration of a switching circuit according to a first embodiment.

The switching circuit (portion surrounded by dashed line 1) includes a high-side switch 6 and a low-side switch 7 connected in series, and a driver (portion surrounded by dashed line 9) for controlling the high-side switch 6, and drives an inductive load 12. The low-side switch 7 includes a rectifier 8 as a parasitic diode.

The high-side switch 6 is connected between a high potential terminal 2 and an output terminal 3. The high-side switch 6 is constituted by a P-channel MOSFET (hereinafter "PMOS"); a power source potential VIN is supplied to a source via the high potential terminal 2; and a drain is connected to the output terminal 3. Additionally, a control terminal (gate) 6g of the high-side switch 6 is connected to the driver 9. The parasitic diode (not illustrated in the drawings) is included in the high-side switch 6.

The low-side switch 7 is connected between the output terminal 3 and a low potential terminal 4. The low-side switch 7 is an N-channel MOSFET (hereinafter "NMOS"); a source is grounded via the low potential terminal 4; and a drain is connected to the output terminal 3. Additionally, a low-side control signal VL is input to a gate of the low-side switch 7 via an input terminal 11.

The low-side switch 7 switches ON and OFF based on the low-side control signal VL input from the outside via the input terminal 11.

The rectifier 8 is connected between the output terminal 3 and the low potential terminal 4, with a direction from the low potential terminal 4 toward the output terminal 3 being a forward direction.

The driver 9 includes a first pulse generator 13, a first short detector 14, and a latching circuit 15, and switches the high-side switch 6 ON and OFF. Additionally, after switching the high-side switch 6 ON, the driver 9 generates a first pulse signal VP that changes to a high level during a period T3, which is after a first period T1 until a high-side control signal VH changing.

The first period T1 is a period that is longer than a backward recovery time Trr of the rectifier 8. During the backward recovery time Trr of the rectifier 8, a backward recovery current flows to the high-side switch 6, and an output potential VLX switches to low level. Thus, the first period T1 is set to be a longer period than the backward recovery time Trr of the rectifier 8, which can detect shorts of the output terminal 3.

The first pulse generator 13 generates the first pulse signal VP by inputting the high-side control signal VH. The first pulse generator 13 delays the fall of the high-side control signal VH from the high level to a low level for the first period T1 and, furthermore, generates the inverted first pulse signal VP. The first pulse signal VP changes from high level to low level, synchronous with the rise of the high-side control signal VH from the low level to the high level. In other words, the first pulse signal VP is a signal changing after the first period T1. The first pulse signal VP permits and forbids operation of the first short detector 14.

During the period when the first pulse signal VP is the high level, the first short detector 14 detects a short of the output terminal 3 with the low potential terminal 4, and generates a short detection signal VD. The short detection signal VD changes to a high level when a short is detected and changes to a low level when a short is not detected. Additionally, operation of the first short detector 14 is forbidden during the period when the first pulse signal VP is the low level, and the short detection signal VD changes to the low level, which indicates that a short is not detected.

The latching circuit 15 is reset when a reset signal input to a reset terminal R is a high level, and is a circuit that outputs a low level to an output terminal Q. The latching circuit 15 is reset when the switching circuit 1 is powered ON. The short detection signal VD is input into the setting terminal S of the latching circuit 15. A power-ON reset signal is input from a reset circuit 16 to the reset terminal R of the latching circuit 15. The latching circuit 15 is set when a setting signal input to the setting terminal S is a high level, and outputs a high level to the output terminal Q.

The latching circuit 15 is set when the first short detector 14 detects a short of the output terminal 3 with the low potential terminal 4, and generates a shorted-state signal VS at the output terminal Q. When the latching circuit 15 is set by the high level short detection signal VD, the shorted-state signal VS changes to a high level and maintains a high level state until being powered-on again.

OR circuit 17 generates a signal VG of a control terminal 6g of the high-side switch 6 as a logical sum of the shorted-state signal VS and the high-side control signal VH.

Figure 2:
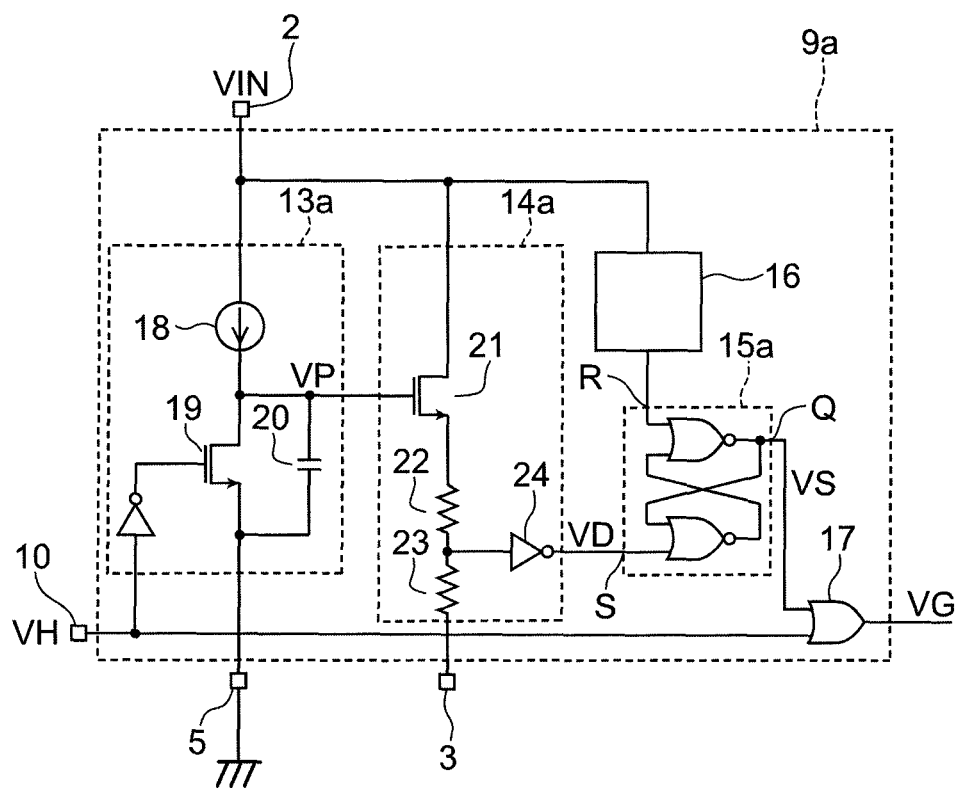
FIG. 2 is a circuit diagram illustrating a configuration of a driver.

FIG. 2 is a circuit diagram illustrating a configuration of a driver.

Note that the same numerals used in FIG. 1 are used for the same constituents. A driver 9a, a first short detector 14a, and a latching circuit 15a are each surrounded by dashed lines.

As illustrated in FIG. 2, a first pulse generator 13a of the driver 9a has a constant current source circuit 18, and is connected to the high potential terminal 2. An NMOS 19 and a capacitor 20 are connected in parallel between the constant current source circuit 18 and a ground terminal 5. An inverted signal of the high-side control signal VH is input to a gate of the NMOS 19, and the NMOS 19 switches ON and OFF based on the high-side control signal VH. The constant current source circuit 18 charges the capacitor 20. The first pulse signal VP is generated as a terminal voltage of the capacitor 20.

In the first short detector 14a, a first transistor 21, a first resistor 22 and a resistor 23 are connected in series between the high potential terminal 2 and the output terminal 3. The first transistor 21 is constituted by an NMOS, and the first pulse signal VP is input to the gate. The first transistor 21 switches ON and OFF based on the first pulse signal VP. When the first transistor 21 is ON, the first transistor 21 operates as a source follower. The first resistor 22 and the resistor 23 divide a difference in potential that exists between the high level of the first pulse signal VP and the output potential VLX. A first buffer 24 constituted by an inverter circuit (INV) inverts the difference in potential divided by the first resistor 22 and the resistor 23, and outputs it as the short detection signal VD.

The latching circuit 15a is constituted by a pair of NOR circuits.

The short detection signal VD is input into the setting terminal S of the latching circuit 15a. The reset terminal R of the latching circuit 15a is connected to an output of the reset circuit 16.

When power is applied and the power source potential VIN is supplied to the high potential terminal 2, the reset circuit 16 outputs the power-ON reset signal and resets the latching circuit 15a.

The latching circuit 15a generates the shorted-state signal VS in the output terminal Q. When a short of the output terminal 3 with the low potential terminal 4 is detected by the first short detector 14a, the latching circuit 15a is set. When the latching circuit 15a is set by a high level short detection signal VD, the shorted-state signal VS switches to a high level and maintains the high level state until being powered-on again.

Next, the operation of the switching circuit 1 will be described.

FIGS. 3A to 3H are timing charts of major signals of the switching circuit of the first embodiment. FIG. 3A illustrates the high-side control signal VH, FIG. 3B illustrates the low-side control signal VL, FIG. 3C illustrates the first pulse signal VP, FIG. 3D illustrates the short detection signal VD, FIG. 3E illustrates the signal VG of the control terminal, FIG. 3F illustrates the output potential VLX, FIG. 3G illustrates the shorted-state signal VS, and FIG. 3H illustrates a high-side current IH.

FIG. 3A illustrates an example of a case where a block pulse having periodically repeating high levels and low levels is input as the high-side control signal VH. The low-side control signal VL is a signal in phase with the high-side control signal VH (FIG. 3B).

FIG. 3B illustrates the low-side switch 7 being switched ON and OFF, depicting each state with "ON" or "OFF". FIG. 3E illustrates the high-side switch 6 being switched ON and OFF, depicting each state with "ON" or "OFF".

Dead time provided to prevent the high-side switch 6 and the low-side switch 7 from both being switched ON at the same time is not illustrated in the drawings. The shorted-state signal VS is a low level, and is in a state indicating that a short is not detected (FIG. 3G).

(1) First, operation when the high-side control signal VH input from an external source is the high level and the low-side control signal VL is the high level will be described (FIGS. 3A and 3B).

An OR 17 outputs a high level as the signal VG of the control terminal 6g of the high-side switch 6 (FIG. 3E). The high-side switch 6 is switched OFF, and the low-side switch 7 is switched ON. Thus, the output terminal 3 is electrically connected to the low potential terminal 4, and the output potential VLX is a low level (FIG. 3F). A regenerated current of the inductive load 12 is flowing in the low-side switch 7.

The first pulse generator 13a outputs a low level as the first pulse signal VP (FIG. 3C). The first transistor 21 of the first short detector 14a is switched OFF. The first transistor 21 has a parasitic diode (not illustrated) between the drain and the source. Therefore, when the first transistor 21 is OFF, the first resistor 22 is connected to the high potential terminal 2 via the parasitic diode. The short detection signal VD divides the power source potential VIN by the first resistor 22 and the resistor 23 independent of the potential of the output terminal 3 or, in other words, the output potential VLX and, furthermore, becomes a signal inverted at the first buffer 24.

A ratio of resistance values of the first resistor 22 and the resistor 23 is suitably set so that, at this time, the short detection signal VD changes to the low level, which is an indication that a short is not detected, independent of the output potential VLX (FIG. 3D).

(2) Next, operation when the input high-side control signal VH is changed from the high level to the low level (FIG. 3A) and the low-side control signal VL is changed from the high level to the low level (FIG. 3B) will be described.

The first pulse generator 13a generates the first pulse signal VP that is delayed only the first period T1 and is inverted with respect to the high-side control signal VH. In other words, the first pulse signal VP is a signal changing after the first period T1. Thus, the first pulse generator 13a outputs a low level first pulse signal VP (FIG. 3C). There is no change in the operation of the first short detector 14a and the latching circuit 15a; and both the short detection signal VD and the shorted-state signal VS remain at low levels (FIGS. 3D and 3G).

Due to the high-side control signal VH changing to the low level, the OR 17 outputs a low level as the signal VG of the control terminal 6g of the high-side switch 6 (FIG. 3E). The high-side switch 6 is switched ON.

Additionally, due to the low-side control signal VL changing to the low level, the low-side switch 7 is switched OFF. The regenerated current that flowed in the low-side switch 7 when the low-side switch 7 was ON flows through the high-side switch 6 as backward recovery current of the parasitic diode (rectifier). As a result, during the backward recovery time Trr of the rectifier 8, a current IH, having a high current value, of the backward recovery current flows through the high-side switch 6 (portion surrounded by the dashed line R in FIG. 3H).

Moreover, as described above, while the backward recovery current flows through the high-side switch 6, the output potential VLX is the low level (FIG. 3F). Because the output potential VLX changes to the low level regardless of whether there is a short of the output terminal 3 with the low potential terminal 4, shorts of the output terminal 3 cannot be detected during the backward recovery time Trr of the rectifier 8.

(3) When the output terminal 3 is not shorted, the output potential VLX changes to a high level (FIG. 3F) following passage of the backward recovery time Trr. The current IH of the high-side switch 6, rises linearly, and flows through the inductive load 12 (FIG. 3H).

Here, the first pulse generator 13 delays the fall of the high-side control signal VH from the high level to the low level for the first period T1 and, furthermore, generates the inverted first pulse signal VP. After the first period T1 that is longer than the backward recovery time Trr, the first pulse signal VP changes to the high level (FIG. 3C). During the period T3, which lasts until the high-side control signal VH changes, the first pulse signal VP is high level, and operation of the first short detector 14 is permitted.

The first transistor 21 is switched ON by input of the high level first pulse signal VP. At this time, the first transistor 21 operates as a source follower. The first resistor 22 and the resistor 23 divide a difference in potential that exists between the high level potential of the first pulse signal VP and the output potential VLX. The first buffer 24 constituted by an inverter circuit (INV) inverts the difference in potential divided by the first resistor 22 and the resistor 23, and outputs it as the short detection signal VD.

The first short detector 14a is configured to output the short detection signal VD that is the low level when the output potential VLX is the high level, and is the high level when the output potential VLX is the low level. In other words, the high level potential of the first pulse signal VP and a ratio between the resistance values of the first resistor 22 and the resistor 23 are suitably set. A result of a short of the output terminal 3 with the low potential terminal 4 being detected is output to the short detection signal VD.

Because the size of the low-side switch increases as a result of developing high-current of the switching circuit, the backward recovery time Trr of the rectifier 8 is extended. Therefore, the first short detector 14a detects shorts of the output terminal with the low potential terminal 4 after the high-side control signal VH changes to low level and the high-side switch 6 switches ON (FIGS. 3A and 3E), and after the first period T1. Thus, the output potential VLX changes to the low level or the high level based on the presence or absence of a short of the output terminal 3 and, as a result, there is no possibility of false detection.

During the period T3 after the first period T1 until the high-side control signal VH changing, when the output potential VLX is high level (FIG. 3F), the first short detector 14a outputs a low level as the short detection signal VD (FIG. 3D). At this time, a short of the output terminal 3 with the low potential terminal 4 is not detected. Thus, the latching circuit 15a continues to output the low level as the shorted-state signal VS (FIG. 3G).

During the period T3, which lasts until the high-side control signal VH changes from the low level to the high level, the OR 17 outputs a low level as the signal VG of the control terminal 6g of the high-side switch 6 (FIG. 3E). During the period T3, the high-side switch 6 remains ON.

(4) Next, when the input high-side control signal VH changes to the high level (FIG. 3A), the circuit returns to the state described in (1) above. The first pulse generator 13a outputs a low level as the first pulse signal VP (FIG. 3C); the OR 17 outputs a high level as the signal VG of the control terminal 6g of the high-side switch 6 (FIG. 3E); and the high-side switch 6 is switched OFF. Additionally, the low-side control signal VL changes to the high level (FIG. 3B), and the low-side switch 7 is switched ON. In cases where the output terminal 3 is not shorted with the low potential terminal 4, the operation of (1) to (3) is repeated in succeeding cycles.

(5) In cases where the output terminal 3 is shorted with the low potential terminal 4, the output potential VLX is 0 V (portion surrounded by the dashed line Q in FIG. 3F). Because the high-side switch 6 is switched ON, the current IH, having a large short current, flows through the high-side switch 6 (FIG. 3H).

After the input high-side control signal VH changes from the high level to the low level and during the period T3, which is after the first period T1 until the high-side control signal VH changing, the first short detector 14a outputs a high level as the short detection signal VD (FIG. 3D). A short of the output terminal 3 with the low potential terminal 4 is detected. Thus, the latching circuit 15a outputs a high level as the shorted-state signal VS (FIG. 3G). The OR 17 outputs a high level as the signal VG of the control terminal 6g of the high-side switch 6 (FIG. 3E); and the high-side switch 6 is switched OFF. In succeeding cycles and until the latching circuit 15a is reset due to being powered-on again or the like, the high-side switch 6 remains switched OFF and the operation of the switching circuit 1 is stopped.

Thus, the high-side switch 6 is protected from damage caused by excess current in cases where the output terminal 3 is shorted with the low potential terminal 4.

Figure 3:
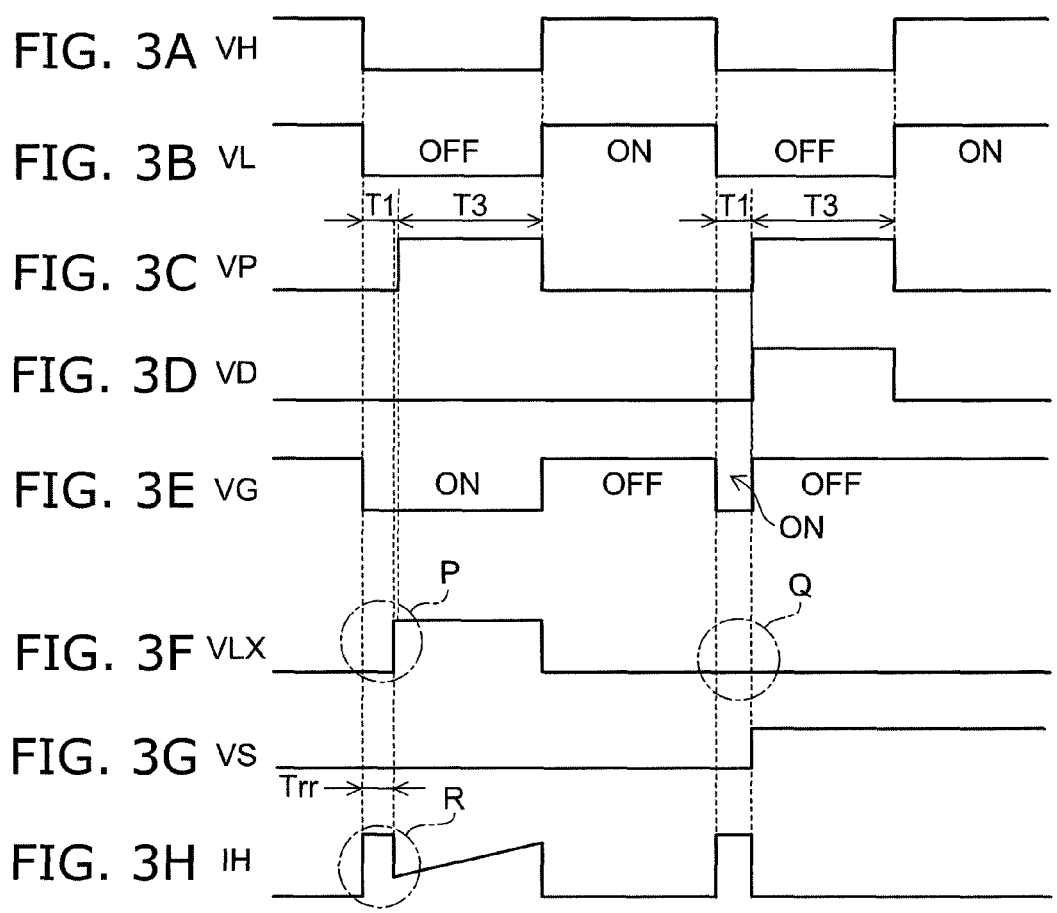
FIGS. 3A to 3H are timing charts of major signals of the switching circuit of the first embodiment.

In FIG. 3, dead time provided to prevent the high-side switch 6 and the low-side switch 7 from both being switched ON at the same time is not illustrated in the drawings. However, in cases where dead time is provided, regenerated current flows through the rectifier 8 of the low-side switch 7 during the dead time. As a result, just as in cases where dead time is not provided, backward recovery current of the rectifier 8 flows through the high-side switch 6 when the high-side switch 6 is switched ON.

Thus, when the high-side control signal VH changes to the low level and the low-side control signal VL changes to the low level, the driver 9 switches the high-side switch 6 ON and switches the low-side switch 7 OFF. At this time, backward recovery current of the rectifier 8 of the low-side switch 7 flows through the high-side switch 6 as the current IH of the high-side switch 6.

When a short of the output terminal 3 with the low potential terminal 4 is detected during the period T3, which is after the first period T1 that is longer than the backward recovery time Trr, until the high-side control signal VH changing, the high-side switch 6 is switched OFF and, thus, the high-side switch 6 is protected from damage.

Figure 4:
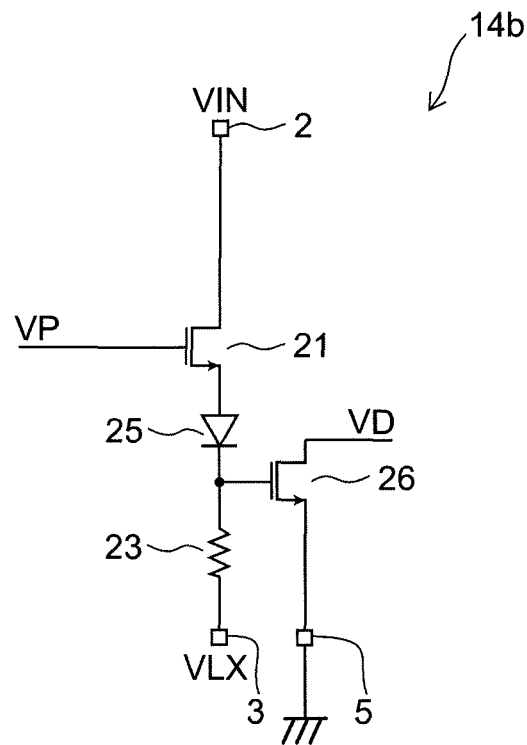
FIG. 4 is a circuit diagram illustrating another configuration of a first short detector.

FIG. 4 is a circuit diagram illustrating another configuration of a first short detector.

In a first short detector 14b illustrated in FIG. 4, the first resistor 22 and the first buffer 24 of the first short detector 14a illustrated in FIG. 2 are replaced by a diode 25 and a first buffer 26, respectively. The first buffer 26 is constituted by an NMOS, and the short detection signal VD is output from a drain of the first buffer 26.

When the first pulse signal VP is the high level, the first transistor 21 operates as a source follower and, roughly, the high level of the first pulse signal VP is input to a gate of the first buffer 26. When the output potential VLX is the low level, the first buffer 26 is switched OFF and a high level is output as the short detection signal VD. When the output potential VLX is the high level, the first buffer 26 is switched ON and a low level is output as the short detection signal VD.

Additionally, when the first pulse signal VP is the low level, the first transistor 21 is switched OFF and the diode 25 is connected to the high potential terminal 2 via the parasitic diode of the first transistor 21. The first short detector 14b outputs a low level as the short detection signal VD, independent of the output potential VLX.

This configuration can be used when the high level potential of the first pulse signal VP is not substantially greater than the output potential VLX.

Figure 5:
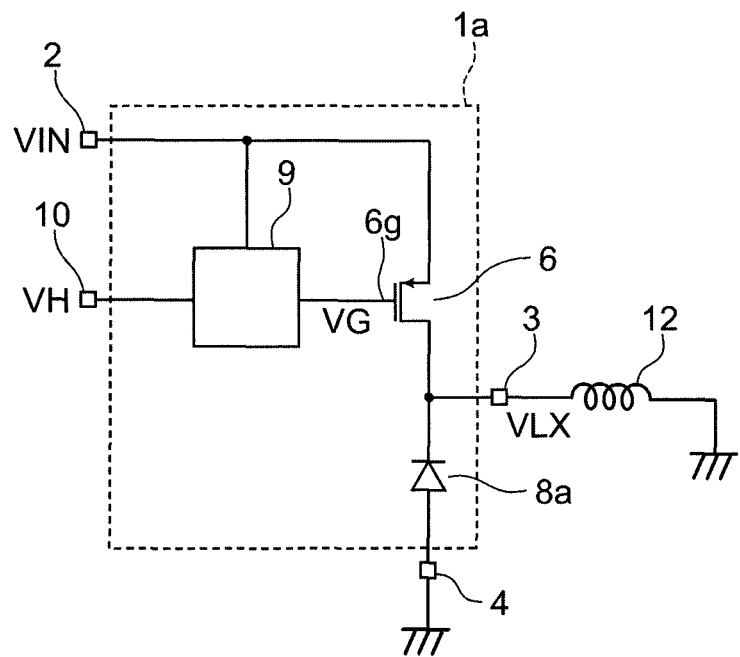
FIG. 5 is a circuit diagram illustrating another configuration of a switching circuit according to the first embodiment.

FIG. 5 is a circuit diagram illustrating another configuration of a switching circuit according to the first embodiment.

As illustrated in FIG. 5, the rectifier 8 of the switching circuit 1 illustrated in FIG. 1 is replaced by a rectifier 8a in a switching circuit 1a. The low-side switch 7 is absent and, for example, a diode can be used for the rectifier 8a. Note that in FIG. 5, the same numerals used in FIG. 1 are used for the same constituents. The high-side switch 6 and the driver 9 are the same as those in the switching circuit 1 of FIG. 1.

In the switching circuit 1a as well, when the high-side control signal VH changes to the low level, the driver 9 switches the high-side switch 6 ON. At this time, backward recovery current of the rectifier 8a flows through the high-side switch 6. When a short of the output terminal 3 with the low potential terminal 4 is detected during the period T3 after the first period T1, which is longer than the backward recovery time Trr of the rectifier 8a, until the high-side control signal VH changing, the high-side switch 6 is switched OFF and, thus, the high-side switch 6 is protected from damage. The switching circuit 1a can, for example, be used in a chopper DC-to-DC converter.

Figure 6:
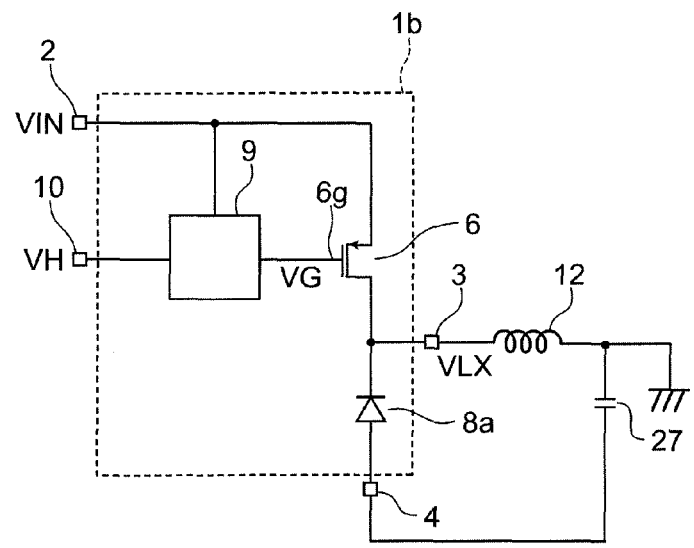
FIG. 6 is a circuit diagram illustrating another configuration of a switching circuit according to the first embodiment.

FIG. 6 is a circuit diagram illustrating another configuration of a switching circuit according to the first embodiment.

As illustrated in FIG. 6, the low potential terminal 4 is not grounded in a switching circuit 1b. A capacitor 27 is connected between the low potential terminal 4 and the ground terminal 5, and an inverted potential of the power source potential VIN is generated at the low potential terminal 4. Note that in FIG. 6, the same numerals used in FIG. 1 are used for the same constituents. The high-side switch 6 and the driver 9 are the same as those in the switching circuit 1a of FIG. 5.

In the switching circuit 1b as well, when the high-side control signal VH changes to the low level, the driver 9 switches the high-side switch 6 ON. At this time, backward recovery current of the rectifier 8a flows through the high-side switch 6. When a short of the output terminal 3 with the low potential terminal 4 is detected during the period T3 after the first period T1, which is longer than the backward recovery time Trr of the rectifier 8a, until the high-side control signal VH changing, the high-side switch 6 is switched OFF and, thus, the high-side switch 6 is protected from damage. The switching circuit 1b can, for example, be used in a negative potential generating inverting converter.

As described above while referencing FIGS. 1 to 6, the switching circuit according to the first embodiment is provided with a driver that switches the high-side switch ON based on an input high-side control signal; and when a short of an output terminal with a low potential terminal is detected during a period after a first period, which is longer than a backward recovery time of a rectifier, until the high-side control signal changes, switches the high-side switch OFF. As a result, the high-side switch can be protected from damage caused by short current.

(Second Embodiment)

Figure 7:
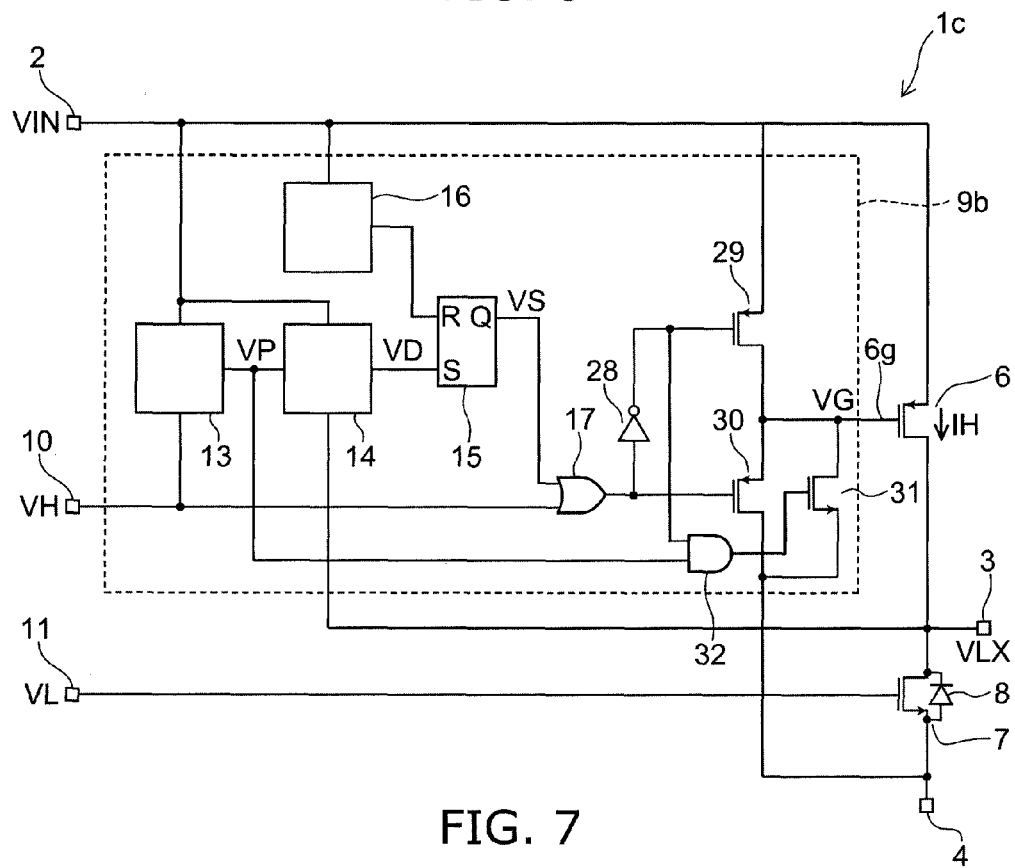
FIG. 7 is a circuit diagram illustrating a configuration of a switching circuit according to a second embodiment.

FIG. 7 is a circuit diagram illustrating a configuration of a switching circuit according to a second embodiment.

As illustrated in FIG. 7, the driver 9 of the switching circuit 1 illustrated in FIG. 1 is replaced by a driver 9b (portion surrounded by the dashed line) in a switching circuit 1c. Note that in FIG. 6, the same numerals used in FIG. 1 are used for the same constituents. The high-side switch 6 and the low-side switch 7 having the rectifier 8 are the same as those in the switching circuit 1 of FIG. 1. Additionally, the inductive load 12 is not illustrated in the drawing.

In the driver 9b, an INV 28, PMOS 29 and 30, an NMOS 31, and an AND circuit 32 are added to the driver 9 illustrated in FIG. 1. The first pulse generator 13, the first short detector 14, the latching circuit 15, the reset circuit 16, and the OR 17 are the same as those in the driver 9. The PMOS 29 and 30, and the NMOS 31 are connected between an output terminal of the OR 17 that outputs the logical sum of the shorted-state signal VS and the high-side control signal VH, and the control terminal 6g of the high-side switch 6.

A source of the PMOS 29 is connected to the high potential terminal 2, and a drain is connected to the control terminal 6g of the high-side switch 6. A gate of the PMOS 29 is connected to an output terminal of the INV 28. A source of the PMOS 30 is connected to the control terminal 6g, and a drain is connected to the low potential terminal 4. A gate of the PMOS 30 is connected to the output terminal of the OR 17.

The NMOS 31 is connected in parallel with the PMOS 30. A source of the NMOS 31 is connected to the control terminal 6g, and a drain is connected to the low potential terminal 4. The logical sum of the first pulse signal VP and the output signal of the OR 17 generated by the AND circuit 32 is input to a gate of the NMOS 31.

Next, the operation of the switching circuit 1c will be described.

Figure 8:
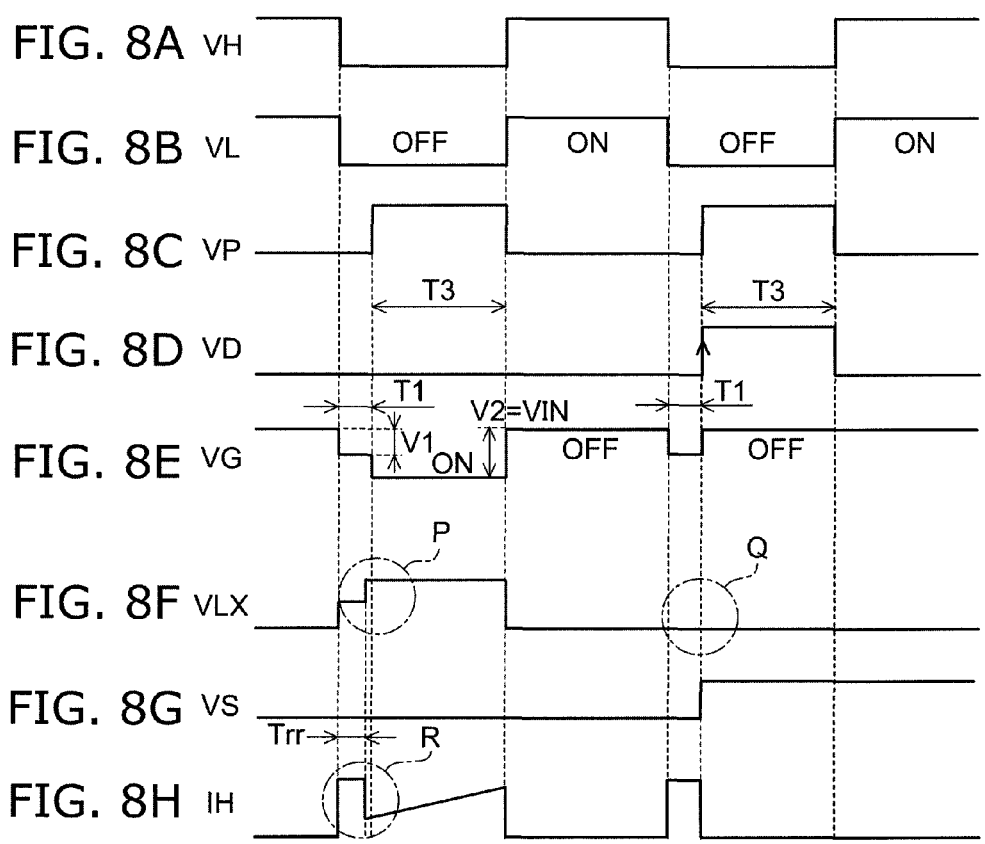
FIGS. 8A to 8H are timing charts of major signals of the switching circuit of the second embodiment.

FIGS. 8A to 8H are timing charts of major signals of the switching circuit of the second embodiment. FIG. 8A illustrates the high-side control signal VH, FIG. 8B illustrates the low-side control signal VL, FIG. 8C illustrates the first pulse signal VP, FIG. 8D illustrates the short detection signal VD, FIG. 8E illustrates the signal VG of the control terminal, FIG. 8F illustrates the output potential VLX, FIG. 8G illustrates the shorted-state signal VS, and FIG. 8H illustrates a high-side current IH.

FIGS. 8A and 8B illustrate an example of a case where a block pulse having periodically repeating high levels and low levels is input as the high-side control signal VH (FIG. 8A). The low-side control signal VL is a signal in phase with the high-side control signal VH (FIG. 8B).

FIG. 8B illustrates the low-side switch 7 being switched ON and OFF, depicting each state with "ON" or "OFF". FIG. 8E illustrates the high-side switch 6 being switched ON and OFF, depicting each state with "ON" or "OFF". Dead time provided to prevent the high-side switch 6 and the low-side switch 7 from both being switched ON at the same time is not illustrated in the drawings.

(1c) First, operation when the high-side control signal VH input is the high level and the low-side control signal VL is the high level will be described (FIGS. 8A and 8B). The high-side switch 6 is switched OFF. Additionally, the low-side switch 7 is switched ON and electrically connects the output terminal 3 to the low potential terminal 4. The output potential VLX is the low level (FIG. 8F). Because the first pulse generator 13 outputs a low level as the first pulse signal VP, the first short detector 14 is in a state in which operation is forbidden. The first short detector 14 outputs a low level as the short detection signal VD, indicating that a short is not detected (FIG. 8D). At this time, a regenerated current similar to that of the inductive load 12 that is connected to the output terminal 3 in FIG. 1 flows through the low-side switch 7.

(2c) Next, operation when the high-side control signal VH is changed from the high level to the low level (FIG. 8A) and the low-side control signal VL is changed from the high level to the low level (FIG. 8B) will be described. The regenerated current that switched the low-side switch 7 OFF and that flowed through the low-side switch 7 flows through the rectifier 8.

Because the first short detector 14 delays the first pulse signal VP for the first period T1 with respect to the high-side control signal VH, the low level continues to be output as the short detection signal VD (FIG. 8D).

The OR 17 outputs a low level, the PMOS 29 is switched OFF, the PMOS 30 is switched ON, and the NMOS 31 is switched OFF. Because the PMOS 30 is a source follower output, the potential of the signal VG of the control terminal 6g of the high-side switch 6 becomes a first voltage V1 that is a threshold value voltage Vth of the PMOS 30 higher than the potential of the low potential terminal 4 (FIG. 8E). In FIG. 8E, the potential of the signal VG of the control terminal 6g is illustrated with the power source potential VIN of the high potential terminal 2 as a reference. Additionally, the first voltage V1 is a difference in potential between the power source potential VIN and the potential of the signal VG of the control terminal 6g, and takes a direction of a positive value.

Here, the first voltage V1 is set to be lower than the power source potential VIN of the high potential terminal 2. An ON-resistance Ron of the high-side switch 6 is a value larger than cases where the power source potential VIN is supplied. As a result, the backward current of the rectifier 8 restricted by the ON-resistance Ron flows through the high-side switch 6 as the current IH of the high-side switch 6 (portion surrounded by the dashed line R in FIG. 8H).

Moreover, during the period when the backward recovery current is flowing through the high-side switch 6, the output potential VLX is the low level (FIG. 8F). Thus, shorts of the output terminal 3 cannot be detected during the backward recovery time Trr of the rectifier 8.

When the output terminal 3 is not shorted, the output potential VLX changes to the high level (FIG. 8F) following passage of the backward recovery time Trr. The current IH of the high-side switch 6, rises linearly, and flows through the inductive load 12 (FIG. 8H).

After the first period T1 that is longer than the backward recovery time Trr, the first pulse generator 13 outputs a high level as the first pulse signal VP during the period T3, which lasts until the high-side control signal VH changes (FIG. 8C). Operation of the first short detector 14 is permitted and, based on the output potential VLX, a high level or a low level is output as the short detection signal VD. Results of detecting a short of the output terminal 3 with the low potential terminal 4 are output to the short detection signal VD.

Shorts are not detected because the output potential VLX is the high level (portion surrounded by the dashed line P in FIG. 8F), and the first short detector 14 outputs a low level as the short detection signal VD (FIG. 8D). Thus, the latching circuit 15 outputs a low level as the shorted-state signal VS (FIG. 8G).

The AND circuit 32 outputs a high level and switches the NMOS 31 ON, and the signal VG of the control terminal 6g of the high-side switch 6 becomes a second voltage V2 that is higher than the first voltage V1 (FIG. 8E). The high-side switch 6 is in a state of low ON-resistance.

When the high-side control signal VH changes to the low level and the low-side control signal VL changes to the high level, the high-side switch 6 is switched OFF and the low-side switch 7 is switched ON, thereby returning the circuit to the state (1C) described above. In cases where the output terminal 3 is not shorted, the operation of (1c) to (3c) is repeated in succeeding cycles.

(4c) In cases where the output terminal 3 is shorted, after the high-side control signal VH changes from the high level to the low level and during the period T3, which is after the first period T1 until the high-side control signal VH changing, the output potential VLX of the output terminal 3 remains at the low level (portion surrounded by the dashed line Q in FIG. 8F). The first short detector 14 outputs a high level as the short detection signal VD (FIG. 8D), and the latching circuit 15 outputs a high level as the shorted-state signal VS (FIG. 8G).

The OR 17 outputs a high level and switches the PMOS 29 ON. The potential of the signal VG of the control terminal 6g changes to the high level (FIG. 8E), and the high-side switch 6 is switched OFF. The current IH of the high-side switch 6 becomes 0 (FIG. 8H). In succeeding cycles and until the latching circuit 15 is reset due to being powered-on again or the like, the high-side switch 6 remains switched OFF and the operation of the switching circuit 1c is stopped. Thus, excess current can be prevented from continuously flowing through the high-side switch 6 and damage to the high-side switch 6 can be prevented.

During the first period T1, even when the output terminal 3 is shorted with the low potential terminal 4, the current IH flowing through the high-side switch 6 has a current value that is restricted by the relatively high ON-resistance Ron (FIG. 8H).

As a result, the high-side switch 6 can be more effectively protected from damage caused by excess current.

During the first period T1, the high-side switch 6 maintains a relatively high ON-resistance. However, the first period T1 is a period when the high-side control signal VH is the low level or, in other words, provided that the first period T1 is sufficiently shorter than the period when the high-side switch 6 is switched ON, is a period when very little decline in operating efficiency occurs.

In the switching circuit 1c illustrated in FIG. 7, the PMOS 29 and 30 and the NMOS 31 each constitute the circuits that generate the signal VG of the control terminal 6g of the high-side switch 6. However, PMOS and NMOS may be interchanged.

As described above while referencing FIGS. 7 and 8A to 8H, the switching circuit according to the second embodiment, based on the high-side control signal, supplies a first voltage to the control terminal of the high-side switch, thereby switching the high-side switch ON in a state of relatively high ON-resistance. Moreover, after a first period until the high-side control signal changing, false detections are few because shorts of the output terminal are detected. Furthermore, when a short of the output terminal is detected, the high-side switch is switched OFF. When a short of the output terminal is not detected, a second voltage that is higher than the first voltage is supplied to the control terminal of the high-side switch, thereby causing a low ON-resistance state of the high-side switch.

As a result, the high-side switch can be more effectively protected from damage caused by shorts.

(Third Embodiment)

Figure 9:
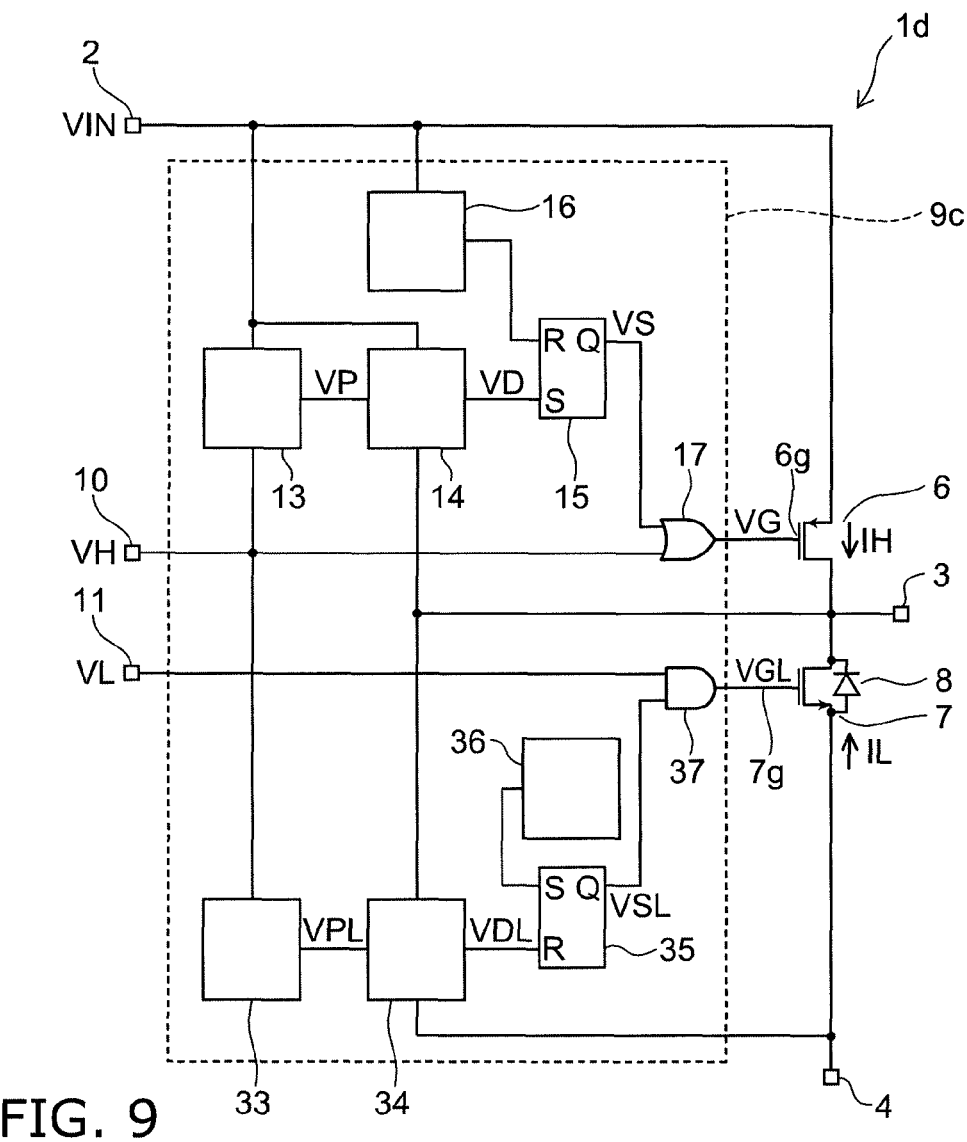
FIG. 9 is a circuit diagram illustrating a configuration of a switching circuit according to a third embodiment.

FIG. 9 is a circuit diagram illustrating a configuration of a switching circuit according to a third embodiment.

As illustrated in FIG. 9, the driver 9 of the switching circuit 1 illustrated in FIG. 1 is replaced by a driver 9c (portion surrounded by the dashed line) in a switching circuit 1d. Note that in FIG. 9, the same numerals used in FIG. 1 are used for the same constituents. The high-side switch 6 and the low-side switch 7 having the rectifier 8 are the same as those in the switching circuit 1 of FIG. 1. Additionally, the inductive load 12 is omitted from the drawing.

In the driver 9c, a second pulse generator 33, a second short detector 34, a latching circuit 35, a setting circuit 36, and an AND circuit 37 are added to the driver 9 illustrated in FIG. 1, and generate a gate signal VGL of the low-side switch 7. The first pulse generator 13, the first short detector 14, the latching circuit 15, the reset circuit 16, and the OR 17 that generate the signal VG of the control terminal 6g of the high-side switch 6 are the same as those in the driver 9.

In the driver 9c, the high-side control signal VH is input to the second pulse generator 33. The second pulse generator 33 generates a second pulse signal VPL that is delayed for a second period T2 following the rise of the high-side control signal VH from the low level to the high level. Here, the second period T2 is a period longer than the delay time when switching the high-side switch 6 from ON to OFF. The second pulse signal VPL changes from the low level to the high level with the passage of a period T4, synchronous with the fall of the high-side control signal VH from the high level to the low level. The second pulse signal VPL permits and forbids operation of the second short detector 34.

During the period when the second pulse signal VPL is the high level, the second short detector 34 detects a short of the output terminal 3 with the high potential terminal 2, and generates a short detection signal VDL. The short detection signal VDL changes to the low level when a short is detected and changes to the high level when a short is not detected. Additionally, operation of the second short detector 34 is forbidden during the period when the second pulse signal VPL is the low level, and the short detection signal VDL switches to the low level, which indicates that a short is not detected.

The latching circuit 35 is reset when a reset signal input to a reset terminal R is the high level, and is a circuit that outputs a low level to an output terminal Q. The short detection signal VDL is input into the reset terminal R of the latching circuit 35. A power-ON setting signal is input to the setting terminal S of the latching circuit 15 from the setting circuit 36. The latching circuit 35 is set when a setting signal input to the setting terminal S is the high level, and outputs a high level to the output terminal Q. The latching circuit 35 is set when the switching circuit 1d is powered ON.

The latching circuit 35 is reset when the second short detector 34 detects a short of the output terminal 3 with the high potential terminal 2, and generates a shorted-state signal VSL in the output terminal Q. When the latching circuit 35 is reset by a high level short detection signal VDL, the shorted-state signal VSL changes to the low level and maintains the low level state until being powered-on again.

The AND circuit 37 calculates the logical product of the shorted-state signal VSL and the low-side control signal VL and generates the gate signal VGL of the low-side switch 7. The shorted-state signal VSL masks the low-side control signal VL, thus restricting the period when the low-side switch 7 is switched ON.

Figure 10:
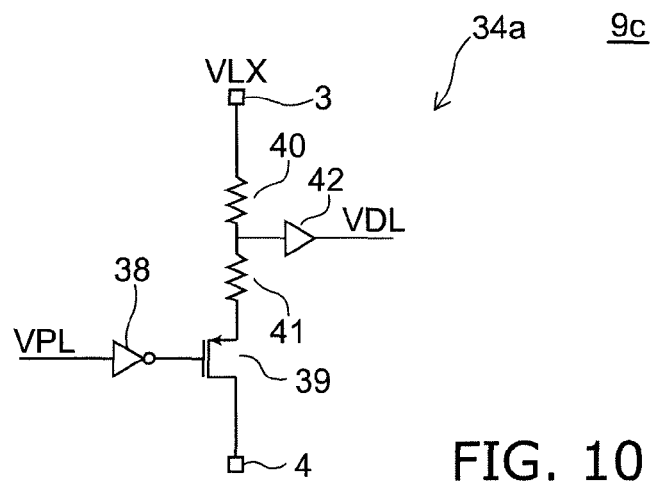
FIG. 10 is a circuit diagram illustrating a configuration of a second short detector.

The second pulse generator 33 and the latching circuit 35 are configured the same as the first pulse generator 13a and the latching circuit 15 illustrated in FIG. 2, respectively. The second short detector 34 can, for example, be configured as illustrated in FIG. 10.

In a second short detector 34a, a second transistor 39, a second resistor 40, and a resistor 41 are connected in series between the output terminal 3 and the low potential terminal 4. The second transistor 39 is constituted by a PMOS, and a signal that is the second pulse signal VPL, inverted by an INV 38, is input to a gate thereof. The second transistor 39 switches ON and OFF based on the second pulse signal VPL. When the second transistor 39 is ON, the second transistor 39 operates as a source follower. A source potential of the second transistor 39 is a value that is a threshold value voltage Vth higher than the low level potential of the INV 38.

The second resistor 40 and the resistor 41 divide a difference in potential that exists between the output potential VLX and the source potential of the second transistor 39. A second buffer 42 outputs the difference in potential divided by the second resistor 40 and the resistor 41 as the short detection signal VDL.

Note that, depending on the low level potential of the INV 38, the resistor 41 may be replaced by a diode, the same as in the first short detector 14b illustrated in FIG. 4.

Next, the operation of the switching circuit 1d will be described.

Figure 11:
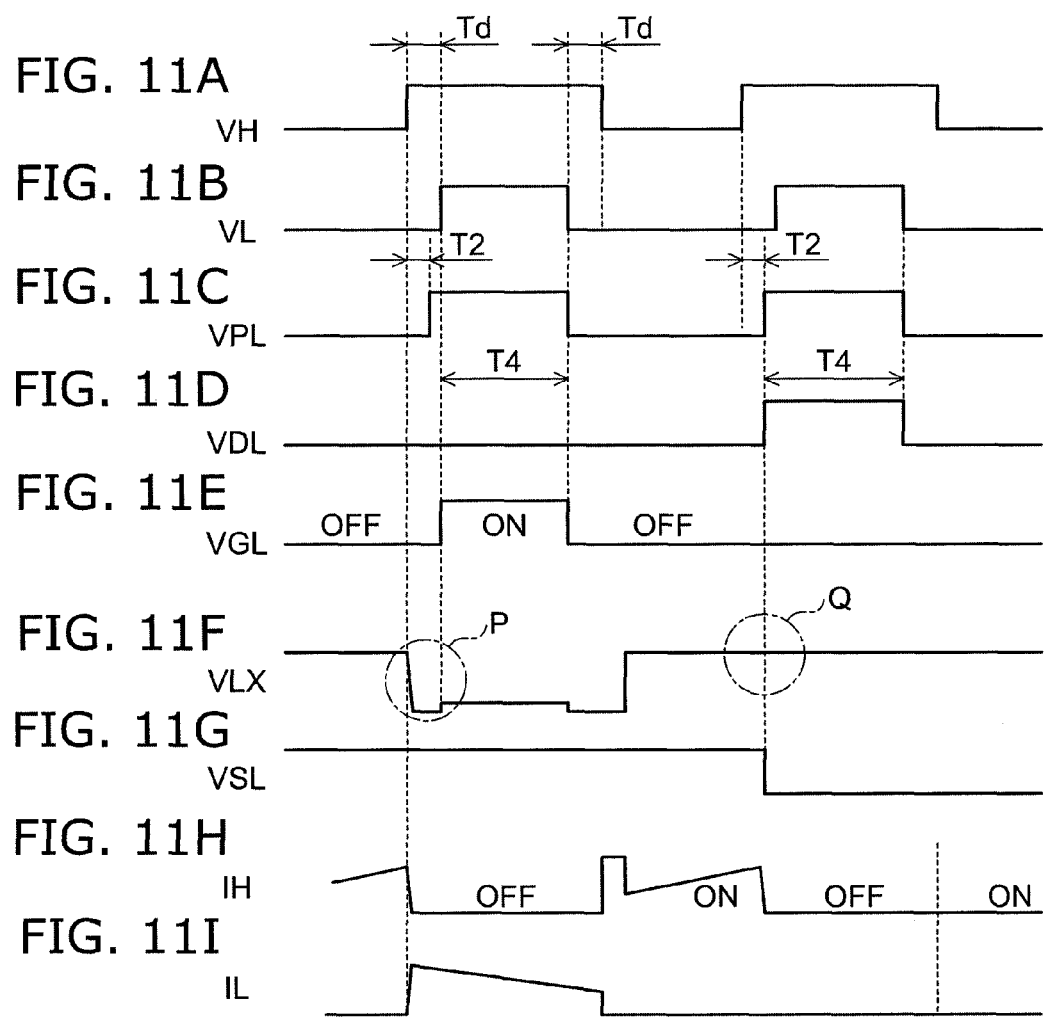
FIGS. 11A to 11I are timing charts of major signals of the switching circuit of the third embodiment.

FIGS. 11A to 11I are timing charts of major signals of the switching circuit of the third embodiment. FIG. 11A illustrates the high-side control signal VH, FIG. 11B illustrates the low-side control signal VL, FIG. 11C illustrates the second pulse signal VPL, FIG. 11D illustrates the short detection signal VDL, FIG. 11E illustrates the gate signal VGL, FIG. 11F illustrates the output potential VLX, FIG. 11G illustrates the shorted-state signal VSL, FIG. 11H illustrates a high-side current IH, and FIG. 11I illustrates a low-side current IL.

FIG. 11A illustrates an example of a case where a block pulse having periodically repeating high levels and low levels is input as the high-side control signal VH. The low-side control signal VL is a signal in phase with the high-side control signal VH (FIG. 11B). FIG. 11E illustrates the low-side switch 7 being switched ON and OFF, depicting each state with "ON" or "OFF". FIG. 11H illustrates the high-side switch 6 being switched ON and OFF, depicting each state with "ON" or "OFF". The signal that controls the high-side switch 6 is the same as that illustrated in FIG. 3 and, thus, is omitted.

Additionally, dead time Td to prevent the high-side switch 6 and the low-side switch 7 from both being switched ON at the same time is provided. The shorted-state signal VSL is the high level, and is in a state where a short is not detected (FIG. 11G).

(1d) First, operation when the high-side control signal VH input is the low level and the low-side control signal VL is the low level will be described (FIGS. 11A and 11B). An OR 17 outputs a high level as the signal VG of the control terminal 6g of the high-side switch 6. The high-side switch 6 is switched ON. Additionally, the AND circuit 37 outputs a low level as the gate signal VGL of the low-side switch 7 (FIG. 11E). The low-side switch 7 is switched OFF. At this time, the high-side switch 6 that is in the ON state electrically connects the output terminal 3 to the high potential terminal 2. The output potential VLX changes to the high level (FIG. 11F).

Additionally, the second pulse generator 33 outputs a low level as the second pulse signal VPL and the second transistor 39 is switched OFF. The second short detector 34 is placed in a state where operation is forbidden. The second transistor 39 has a parasitic diode (not illustrated) between the drain and the source. Therefore, when the second transistor 39 is OFF, the resistor 41 is connected to the low potential terminal 4 via the parasitic diode. The second resistor 40 and the resistor 41 divide the output potential VLX and output the divided output potential VLX as the short detection signal VDL via a second buffer 42.

Due to the ratio of the resistance values of the second resistor 40 and the resistor 41 being suitably set, the short detection signal VDL changes to the low level which is an indication that a short is not detected, independent of the output potential VLX (FIG. 11D). Additionally, because the high-side switch 6 is switched ON, the current IH of the high-side switch 6 increases linearly (FIG. 11H). Moreover, because the low-side switch 7 is switched OFF, the current IL of the low-side switch 7 is 0 (FIG. 11I).

(2d) Next, operation when the high-side control signal VH changes from the low level to the high level will be described (FIG. 11A). The OR 17 outputs a low level as the signal VG, and the high-side switch 6 is switched OFF. Because there is a delay in the response from the high-side switch 6, the fall of the output potential VLX is accompanied by delay time, and the diminution of the current IH of the high-side switch 6 is accompanied by delay time (FIGS. 11F and 11G). As a result, shorts of the output terminal 3 with the high potential terminal 2 cannot be detected until the current IH of the high-side switch 6 becomes 0.

The second pulse signal VPL changes to the high level after the OR 17 changes the signal VG of the control terminal 6g of the high-side switch 6 to the high level, and after the second period T2. The second pulse signal VPL is the high level during the period T4, which lasts until the low-side control signal VL changes (FIG. 11C). A low level is input to the gate of the second transistor 39, and the second transistor 39 is switched ON. The second short detector 34a is in a state in which operation is permitted. The second short detector 34a is configured to output the short detection signal VDL that is the low level when the output potential VLX is the low level, and is the high level when the output potential VLX is the high level. In other words, the low level potential of the INV 38 and a ratio between the resistance values of the second resistor 40 and the resistor 41 are suitably set.

(3d) In cases where the output terminal 3 is not shorted with the high potential terminal 2, the output potential VLX is the low level (portion surrounded by the dashed line P in FIG. 11F) and the current IH of the high-side switch 6 is 0 (FIG. 11H).

Thus, the second short detector 34 outputs a low level as the short detection signal VDL, and the latching circuit 35 outputs a high level as the shorted-state signal VSL (FIGS. 11D and 11G). After passing of the dead time Td, when the low-side control signal VL switches to the high level, the AND circuit 37 outputs a high level as the gate signal VGL of the low-side switch 7 (FIGS. 11B and 11E). The low-side switch 7 is switched ON, and the current IL of the low-side switch 7 flows (FIG. 11I).

(4d) Next, when the low-side control signal VL switches to the low level, the circuit returns to the state (1d) described above. The AND circuit 37 outputs a low level as the gate signal VGL of the low-side switch 7 (FIGS. 11B and 11E). The low-side switch 7 is switched OFF. After the passage of the dead time Td, the high-side control signal VH changes to the low level (FIG. 11A), and in cases where the output terminal 3 is not shorted with the high potential terminal 2, the operation of (1d) to (3d) is repeated in succeeding cycles.

(5d) Additionally, in cases when the output terminal 3 is shorted with the high potential terminal 2, the output potential VLX is the high level (portion surrounded by the dashed line Q in FIG. 11F) and, during the period T4, which is after the second period T2 until the low-side control signal VL changing, the second short detector 34 outputs a high level as the short detection signal VDL (FIG. 11D). The latching circuit 35 outputs a low level as the shorted-state signal VSL, indicating that a short has been detected (FIG. 11G).

The AND circuit 37 outputs a low level as the gate signal VGL of the low-side switch 7 (FIG. 11E), and switches OFF the low-side switch 7. In succeeding cycles and until the latching circuit 35 is set due to powered-on again or the like, the low-side switch 7 remains switched OFF and the operation of the switching circuit 1d is stopped. The current IL of the low-side switch 7 becomes 0 (FIG. 11I), and the low-side switch 7 is protected from damage caused by excess current.

The switching circuit according to the third embodiment is provided with a driver that switches the high-side switch ON based on the input high-side control signal; and when a short of an output terminal with a low potential terminal is detected during a period after a first period, which is longer than a backward recovery time of a rectifier, and which lasts until the low-side control signal VL changes, switches the high-side switch OFF. As a result, the high-side switch can be protected from damage caused by short current.

Furthermore, as described above while referencing FIGS. 9 to 11, the switching circuit according to the third embodiment is provided with a driver that switches the low-side switch OFF when a short of the output terminal with the high potential terminal is detected after switching the high-side switch OFF and after a second period that is longer than the delay time of the high-side switch. As a result, the low-side switch can be protected from damage caused by short current.

(Fourth Embodiment)

FIG. 12 is a circuit diagram illustrating a configuration of a DC-to-DC converter according to a fourth embodiment.

As illustrated in FIG. 12, in a DC-to-DC converter 50, a controller 51 for controlling the switching circuit 1*d* is added to the switching circuit 1*d*. The switching circuit 1*d* is the same as the switching circuit 1*d* illustrated in FIG. 9.

In a DC-to-DC converter 52, one end of an inductor 53 is connected to the output terminal 3 of the switching circuit 1*d*. Feedback resistors 54 and 55 are connected in series between a second end of the inductor 53 and the low potential terminal 4. Furthermore, a filter capacitor 56 is connected between the second end of the inductor 53 and the low potential terminal 4.

The power source potential VIN is supplied to the high potential terminal 2, and the low potential terminal 4 is grounded.

The feedback resistors 54 and 55 feed a voltage VFB, which is a divided voltage of an output voltage VOUT of the second end of the inductor 53, back to the controller 51.

The controller 51 generates a PWM signal based on the input voltage VFB, and outputs this PWM signal as the high-side control signal VH and the low-side control signal VL to the switching circuit 1*d*. The controller 51 controls the switching circuit 1*d* based on the output voltage VOUT of the second end of the inductor 53.

Next, operation of the DC-to-DC converter 50 will be described.

FIGS. 13A to 13G are timing charts of the major signals of the DC-to-DC converter of the fourth embodiment. FIG. 13A illustrates the high-side control signal VH, FIG. 13B illustrates the low-side control signal VL, FIG. 13C illustrates the signal VG of the control terminal, FIG. 13D illustrates the output potential VLX, FIG. 13E illustrates the high-side current IH, FIG. 13F illustrates a low-side current IL, and FIG. 13G illustrates an inductor current ILL.

FIG. 13B illustrates the low-side switch 7 being switched ON and OFF, depicting each state with "ON" or "OFF". FIG. 13C illustrates the high-side switch 6 being switched ON and OFF, depicting each state with "ON" or "OFF". Additionally, dead time Td is provided to prevent the high-side switch 6 and the low-side switch 7 from both being switched ON at the same time.

(1e) First, operation when the controller 51 outputs a high level as the high-side control signal VH and a low level as the low-side control signal VL will be described (FIGS. 13A and 13B). The driver 9*c* outputs a high level as the signal VG of the control terminal 6*g* of the high-side switch 6 (FIG. 13C). The high-side switch 6 is switched OFF. Additionally, the driver 9*c* outputs a high level as the gate signal VGL of the low-side switch 7, and switches the low-side switch 7 ON. At this time, the output potential VLX (potential of the output terminal 3) of the switching circuit 1*d* is the low level (FIG. 13D). The current IL equivalent to the current ILL of the inductor 53 flows through the low-side switch 7 (FIGS. 13F and 13G).

(2e) Next, when the controller 51 changes the high-side control signal VH from the high level to the low level and the low-side control signal VL from the high level to the low level (FIGS. 13A and 13B), the driver 9*c* outputs a low level as the gate signal VGL of the low-side switch 7, and switches the low-side switch 7 OFF. The current IL that flowed through the low-side switch 7 flows through the rectifier 8.

The driver 9*c* outputs a low level as the signal VG of the control terminal 6*g* of the high-side switch 6 (FIG. 13C). As a result, the backward current of the rectifier 8 flows as the current IH of the high-side switch 6 (portion surrounded by the dashed line R in FIG. 13E), and the current ILL of the inductor 53 increases (FIG. 13G.

(3e) After the input high-side control signal VH changes to low level and during the period T3, which is after the first period T1 until the high-side control signal VH changing, in cases where the output potential VLX is the high level (portion surrounded by the dashed line P in FIG. 13D), the first short detector 14 does not detects shorts. The driver 9*c* outputs a low level as the signal VG of the control terminal 6*g* of the high-side switch 6 (FIG. 13C). The output potential VLX of the switching circuit 1*d* rises to the power source potential VIN after the passage of the backward recovery time of the rectifier 8 (FIG. 13D). The current IH of the high-side switch 6 and the current ILL of the inductor 53 rise in a substantially linear manner (FIGS. 13E and 13G).

(4e) Next, when the controller 51 changes the high-side control signal VH to the high level and the low-side control signal VL to the high level, the circuit is returned to the state (1e) described above. The driver 9*c* outputs a high level as the signal VG (FIG. 13C), and switches the high-side switch 6 OFF. Additionally, the driver 9*c* outputs a high level as the gate signal VGL of the low-side switch 7, and switches the low-side switch 7 ON. The current ILL of the inductor 53 flows through the low-side switch 7 (FIGS. 13F and 13G). In cases where a short is not detected, the operation of (1e) to (3e) is repeated in succeeding cycles.

(5e) During the period T3, which is after the first period T1 until the high-side control signal VH changing, in cases where the output potential VLX is the low level (portion surrounded by the dashed line Q in FIG. 13D), the first short detector 14 detects shorts. The driver 9*c* outputs a high level as the signal VG of the control terminal 6*g* (FIG. 13C). The high-side switch 6 is switched OFF, and the current IH of the high-side switch 6 becomes 0 (FIG. 13E). In succeeding cycles, the high-side switch 6 remains OFF until being powered-on again, and the operation of the DC-to-DC converter 50 is stopped.

As described above, in the DC-to-DC converter 52, when the controller 51 outputs a high level as the high-side control signal VH and a high level as the low-side control signal VL, the driver 9*c* switches the high-side switch 6 OFF and the low-side switch 7 ON. At this time, the current IL equivalent to the current ILL of the inductor 53 flows through the low-side switch 7.

Additionally, when the controller 51 changes the high-side control signal VH to the low level and the low-side control signal VL to the low level, the driver 9*c* outputs a high level as the gate signal VGL of the low-side switch 7, and switches the low-side switch 7 OFF. At the same time, the driver 9*c* outputs a low level as the signal VG, and switches the high-side switch 6 ON. At this time, the backward recovery current of the rectifier 8 flows as the current IH of the high-side switch 6.

Moreover, when the output potential VLX remains as the low level after the changing of the high-side control signal VH from high level to low level by the controller 51 and during the period T3, which is after the first period T1 until the high-side control signal VH changing, a short of the output terminal 3 with the low potential terminal 4 is detected. The driver 9c outputs a high level as the signal VG of the control terminal 6g, and switches the high-side switch 6 OFF. Thus, excess current can be prevented from continuously flowing through the high-side switch 6 and damage to the high-side switch 6 can be prevented.

FIGS. 14A to 14G are timing charts of the major signals of the DC-to-DC converter of the fourth embodiment. FIG. 14A illustrates the high-side control signal VH, FIG. 14B illustrates the low-side control signal VL, FIG. 14C illustrates the gate signal VGL, FIG. 14D illustrates the output potential VLX, FIG. 14E illustrates the high-side current IH, FIG. 14F illustrates a low-side current IL, and FIG. 14G illustrates the inductor current ILL.

In FIGS. 14A to 14G, main signals of a DC-to-DC converter used in the switching circuit 1d are depicted.

FIG. 14A illustrates the high-side switch 6 being switched ON and OFF, depicting each state with "ON" or "OFF". FIG. 14C illustrates the low-side switch 7 being switched ON and OFF, depicting each state with "ON" or "OFF". Additionally, dead time Td is provided to prevent the high-side switch 6 and the low-side switch 7 from both being switched ON at the same time.

(1F), First, when the controller 51 outputs a low level as the high-side control signal VH and a low level as the low-side control signal VL (FIGS. 14A and 14B), the driver 9c outputs a low level as the signal VG and switches the high-side switch 6 ON. Additionally, the driver 9c outputs a low level as the gate signal VGL of the low-side switch 7 (FIG. 14C), and switches the low-side switch 7 OFF. At this time, the output potential VLX of the switching circuit 1d is the high level (FIG. 14D). The current IL equivalent to the current ILL of the inductor 53 flows through the low-side switch 7 (FIGS. 14F and 14G).

(2f) Next, when the controller 51 switches the high-side control signal VH from the low level to the high level, the driver 9c outputs a high level as the signal VG and switches the high-side switch 6 OFF (FIG. 14A). The output potential VLX and the current IH of the high-side switch 6 fall based on the delay time of the high-side switch 6 (FIGS. 14D and 14E).

(3f) When the output potential VLX is the low level (portion surrounded by the dashed line P in FIG. 14D) during the period T4, which is after the second period T2 until the low-side control signal VL changing, a short of the output terminal 3 with the high potential terminal 2 is not detected. The driver 9c outputs a high level as the gate signal VGL of the low-side switch 7 (FIG. 14C), and the low-side switch 7 remains ON.

The current IL of the low-side switch 7 and the current ILL of the inductor 53 fall in a substantially linear manner (FIGS. 14F and 14G).

(4f) Next, when the controller 51 changes the high-side control signal VH to the low level and the low-side control signal VL to the low level, the circuit is returned to the state (1f) described above. The driver 9c outputs a low level as the signal VG and switches the high-side switch 6 ON. Additionally, the driver 9c outputs a low level as the gate signal VGL of the low-side switch 7, and switches the low-side switch 7 OFF. The current IH flows through the high-side switch 6 due to the backward recovery current of the rectifier 8 of the low-side switch 7 (FIG. 14E). In cases where the output terminal 3 is not shorted, the operation of (1f) to (3f) is repeated in succeeding cycles.

(5f) Additionally, when the output potential VLX is the high level during the period T4, which is after the second period T2 until the low-side control signal VL changing (portion surrounded by the dashed line Q in FIG. 14D), a short is detected. The driver 9c maintains the gate signal VGL at the low level (FIG. 14C), and the low-side switch 7 remains OFF. In succeeding cycles, the low-side switch 7 remains OFF until being powered-on again, and the operation of the DC-to-DC converter 50 is stopped.

As described above, in the DC-to-DC converter 52, when the controller 51 outputs a low level as the high-side control signal VH and a low level as the low-side control signal VL, the driver 9c switches the high-side switch 6 ON and the low-side switch 7 OFF.

Additionally, when the controller 51 changes the high-side control signal VH to the high level, the driver 9c switches the high-side switch 6 OFF. At this time, the output potential VLX and the current IH of the high-side switch 6 fall based on the delay time of the high-side switch 6. Moreover, when the output potential VLX is the high level during the period T4, which is after the second period T2 until the low-side control signal VL changing, a short of the output terminal 3 with the high potential terminal 2 is detected. The driver 9c maintains the gate signal VGL of the low-side switch 7 at the low level; the low-side switch 7 remains OFF; and the operation of the DC-to-DC converter 50 is stopped. Therefore, excess current of the low-side switch 7 is prevented, which leads to damage being prevented.

Note that DC-to-DC converter using the switching circuit 1d was described. However, the other switching circuits 1, 1a, 1b, and 1c can also be used as the switching circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A switching circuit comprising:
    a high-side switch connected between a high potential terminal and an output terminal;
    a rectifier connected between the output terminal and a low potential terminal, forward direction of the rectifier being a direction from the low potential terminal to the output terminal; and
    a driver connected between the high potential terminal and the output terminal, the driver switching a high-side switch ON based on a high-side control signal, the driver switching the high-side switch OFF when a first short detector detects shorts of the output terminal with the low potential terminal after a first period longer than a backward recovery time of the rectifier until the high-side control signal changing.

2. The circuit according to claim 1, wherein the driver switches the high-side switch ON by supplying a first voltage to a control terminal of the high-side switch, and supplying a second voltage being higher than the first voltage when a short of the output terminal with the low potential terminal is not detected after the first period.

3. The circuit according to claim 1, wherein
the driver further includes a first pulse generator inputting the high-side control signal and generating a first pulse signal after the first period,
the first short detector includes:
a first transistor switching ON or OFF based on the first pulse signal;
a first resistor connected in series with the first transistor between the high potential terminal and the output terminal, the first resistor generating a divided potential of a difference in potential between a potential of the first pulse signal and a potential of the output terminal when the first transistor is ON, and the first resistor generating a divided potential of a difference in potential between a potential of the high potential terminal and the output terminal when the first transistor is OFF; and
a first buffer outputting an output potential of the first resistor as a low level when the first transistor is OFF, the first buffer outputting the output potential of the first resistor as the low level or as a high level being higher than the low level based on the potential of the output terminal when the first transistor is ON.

4. The circuit according to claim 1, wherein
the rectifier is a parasitic diode of a low-side switch connected between the output terminal and the low potential terminal,
the driver includes a second short detector connected between the output terminal and the low potential terminal, the second short detector detects shorts of the output terminal with the high potential terminal after a second period until the low-side control signal changing, the driver maintains an OFF state of the low-side switch when a short of the output terminal with the high potential terminal is detected and the driver switches the low-side switch ON based on the input low-side control signal when a short of the output terminal with the high potential terminal is not detected.

5. The circuit according to claim 1, wherein the rectifier is a diode.

6. The circuit according to claim 1, wherein the low potential terminal is grounded via a capacitor.

7. A DC-to-DC converter comprising:
a switching circuit including:
a high-side switch connected between a high potential terminal and an output terminal;
a rectifier connected between the output terminal and a low potential terminal, forward direction of the rectifier being a direction from the low potential terminal to the output terminal; and
a driver connected between the high potential terminal and the output terminal, the driver switching a high-side switch ON based on an input high-side control signal, the driver switching the high-side switch OFF when a first short detector detecting shorts of the output terminal with the low potential terminal after a first period longer than a backward recovery time of the rectifier until the high-side control signal changing, and
a controller generating the high-side control signal of a PWM signal based on an input voltage.

8. The converter according to claim 7, wherein the driver switches the high-side switch ON by supplying a first voltage to a control terminal of the high-side switch, and supplying a second voltage being higher than the first voltage when a short of the output terminal with the low potential terminal is not detected after the first period.

9. The converter according to claim 7, wherein
the driver further includes a first pulse generator inputting the high-side control signal and generating a first pulse signal after the first period,
the first short detector includes:
a first transistor switching ON or OFF based on the first pulse signal;
a first resistor connected in series with the first transistor between the high potential terminal and the output terminal, the first resistor generating a divided potential of a difference in potential between a potential of the first pulse signal and a potential of the output terminal when the first transistor is ON, and the first resistor generating a divided potential of a difference in potential between a potential of the high potential terminal and the output terminal when the first transistor is OFF; and
a first buffer outputting an output potential of the first resistor as a low level when the first transistor is OFF, the first buffer outputting the output potential of the first resistor as the low level or as a high level being higher than the low level based on the potential of the output terminal when the first transistor is ON.

10. The converter according to claim 7, wherein
the rectifier is a parasitic diode of a low-side switch connected between the output terminal and the low potential terminal,
the driver includes a second short detector connected between the output terminal and the low potential terminal, the second short detector detects shorts of the output terminal with the high potential terminal after a second period until the low-side control signal changing, the driver maintains an OFF state of the low-side switch when a short of the output terminal with the high potential terminal is detected and the driver switches the low-side switch ON based on the input low-side control signal when a short of the output terminal with the high potential terminal is not detected.

11. The converter according to claim 7, further comprising:
an inductor, a first end of the inductor connected to the output terminal;
a filter capacitor connected between a second end of the inductor and the low potential terminal; and
a feedback resistor connected between the second end of the inductor and the low potential terminal, for feeding voltage back to the controller.

12. The converter according to claim 11, wherein the driver switches the high-side switch ON by supplying a first voltage to a control terminal of the high-side switch, and supplying a second voltage being higher than the first voltage when a short of the output terminal with the low potential terminal is not detected after the first period.

13. The converter according to claim 11, wherein
the driver further includes a first pulse generator inputting the high-side control signal and generating a first pulse signal after the first period,
the first short detector includes:
a first transistor switching ON or OFF based on the first pulse signal;
a first resistor connected in series with the first transistor between the high potential terminal and the output terminal, the first resistor generating a divided potential of a difference in potential between a potential of the first pulse signal and a potential of the output terminal when the first transistor is ON, and the first resistor generating a divided potential of a difference in potential between a potential of the high potential terminal and the output terminal when the first transistor is OFF; and a first buffer outputting an output potential of the first resistor as a low level when the first transistor is OFF, the first buffer outputting the output potential of the first resistor as the low level or as a high level being higher than the low level based on the potential of the output terminal when the first transistor is ON.

14. The converter according to claim 11, wherein the rectifier is a parasitic diode of a low-side switch connected between the output terminal and the low potential terminal, the driver includes a second short detector connected between the output terminal and the low potential terminal, the second short detector detects shorts of the output terminal with the high potential terminal after a second period until the low-side control signal changing, the driver maintains an OFF state of the low-side switch when a short of the output terminal with the high potential terminal is detected and the driver switches the low-side switch ON based on the input low-side control signal when a short of the output terminal with the high potential terminal is not detected.

* * * * *